United States Patent [19]

Siegenthaler

[11] Patent Number: 5,439,041
[45] Date of Patent: Aug. 8, 1995

[54] VEHICLE TIRE INCLUDING LIGHTWEIGHT STIFFENING SPACER IN EACH SIDEWALL

[75] Inventor: Karl J. Siegenthaler, Rome Ostia, Italy

[73] Assignee: Bridgestone/Firestone, Inc., Akron, Ohio

[21] Appl. No.: 207,523

[22] Filed: Mar. 7, 1994

Related U.S. Application Data

[63] Continuation-in-part of Ser. No. 958,066, Oct. 6, 1992, abandoned.

[30] Foreign Application Priority Data

Oct. 8, 1991 [IT] Italy ............... TO91A0759

[51] Int. Cl.$^6$ ............... B60C 9/02; B60C 15/00; B60C 15/06
[52] U.S. Cl. ............... 152/541; 152/547; 152/548; 152/549; 152/552; 152/555
[58] Field of Search ............... 152/539, 541, 517, 555, 152/548, 516, 547, 549, 552

[56] References Cited

U.S. PATENT DOCUMENTS

| | | |
|---|---|---|
| 709,280 | 9/1902 | Tennant . |
| 3,556,891 | 1/1971 | Martinkovic et al. .......... 152/548 X |
| 3,982,578 | 9/1976 | Wild . |
| 3,994,329 | 11/1976 | Masson et al. . |
| 4,287,924 | 9/1981 | Deck et al. . |
| 4,779,658 | 10/1988 | Kawabata et al. . |

FOREIGN PATENT DOCUMENTS

| | | | |
|---|---|---|---|
| 2529597 | 1/1976 | Germany | 152/517 |
| 62-199506 | 9/1987 | Japan . | |

*Primary Examiner*—Adrienne C. Johnstone
*Attorney, Agent, or Firm*—David A. Thomas

[57] ABSTRACT

A vehicle tire (1), particularly for motor vehicles, defined by an outer tread (2) and two beads (3), each connected to the tread (2) by a respective annular sidewall portion (5); each sidewall portion (5) presenting an inner reinforcing cord assembly (6) defined by at least two layers (7) of reinforcing cords (8) on opposite sides of an extending outwardly of the respective bead (3), and a layer (16) of a lightweight elastomeric sponge filler material located between the two layers (7) of reinforcing cords (8), the thickness of which depends on the rigidity required of the respective sidewall portion (5).

5 Claims, 2 Drawing Sheets

VEHICLE TIRE INCLUDING LIGHTWEIGHT STIFFENING SPACER IN EACH SIDEWALL

CROSS REFERENCE TO RELATED APPLICATION

This application is a continuation-in-part of application Ser. No. 07/958,066, filed Oct. 6, 1992, now abandoned.

BACKGROUND OF THE INVENTION

1. Technical Field

The present invention relates to a vehicle tire, particularly for motor vehicles.

2. Background Information

In particular, the present invention relates to a vehicle tire comprising an outer tread; two beads; two bead fillers; and two annular sidewall portions, each connecting a respective bead to the tread, and each reinforced internally by at least two first layers of reinforcing cords on opposite sides of the bead and extending substantially radially outwardly from the bead, to define a chamber housing the bead and respective filler.

The tires on a motor vehicle form part of a system for damping the vibration transmitted to the vehicle by contact with the road surface. Moreover, inside the tire, certain parts, such as the tread and sidewall portions, i.e. the lateral portions of the tire connecting the tread to the bead portions, define specific shock absorbers capable of absorbing relatively low-frequency vibrations. As regards the sidewall portions, an important point to bear in mind is that the rigidity of these portions affects, not only the ability of the tire to absorb varying, relatively low-frequency radial loads, but also the response of the tire to transverse loads. In other words, by varying the rigidity of the sidewall portions, it is possible to vary the cornering capability of the tire.

There are numerous prior art tires, such as shown in U.S. Pat. Nos. 3,994,329 and 4,287,924 in which the sidewalls are provided with rigid support members of a crescent or lenticular cross-section formed of various hardened rubber which will support the weight of the tire, enabling the tire to run under nearly normal conditions even with complete loss of the inflation air.

Although these safety tire constructions, referred to as "run-flat" tires, do provide rigidity to the sidewalls, the stiffened rubber sidewall inserts increase the weight of the tire.

SUMMARY OF THE INVENTION

It is an object of the present invention to provide a vehicle tire of the aforementioned type, particularly for motor vehicles, the sidewall portions of which are so designed as to enable the rigidity of the same to be varied inexpensively and easily within a given range during normal inflation and running conditions.

It is a further object of the present invention to provide a tire wherein said variation in the rigidity of the sidewall portions is achievable with substantially no change in the weight of the tire itself.

Still another objective of the invention is to provide a tire wherein a lightweight stiffening spacer is located within the sidewall of the tires to provide increased lateral stability when the tire is inflated, yet which permits total collapse of the sidewall upon the tire being deflated.

Another objective is to provide such a tire in which the sidewall stiffeners may be formed of a synthetic rubber containing a lightweight inner filling material, or be formed of a thermosetting plastic or polyurethane foam, or other flexible lightweight filler material.

According to the present invention, there is provided a vehicle tire, particularly for motor vehicles, comprising an outer tread; two beads; two bead fillers; and two annular sidewall portions, each connecting a respective said bead to the tread; each sidewall portion including an inner reinforcing cord assembly defined by at least two spaced apart first layers of reinforcing cords on opposite sides of said bead, to define a chamber housing said bead and said bead filler; the improvement comprising the addition of a lightweight stiffening spacer means housed inside each of said chambers and extending between said respective two first layers, said spacer being formed of a sponge material and having a generally lenticular or biconvex-shaped cross-sectional configuration with a convex surface portion on both sides of the spacer for maintaining clearance between said first layers of reinforcing cords to provide lateral stability to the sidewalls of the tire by increasing the moment of inertia of said vehicle tire when the vehicle tire is inflated, yet which permits total collapse of said side wall portions when the tire is deflated.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

Figure 1:
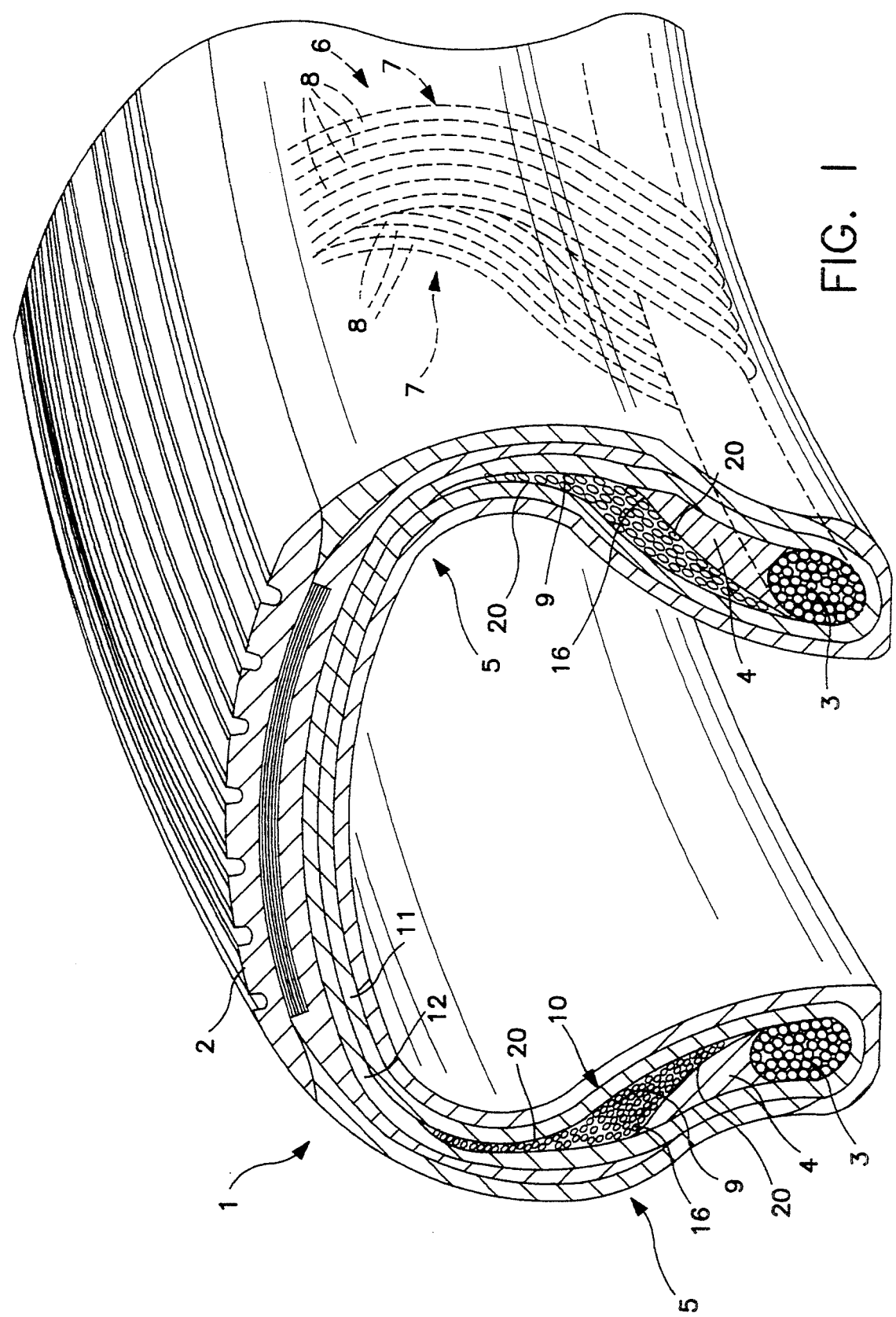
FIG. 1 shows a schematic partial cross section in perspective of a preferred embodiment of the tire according to the present invention.

Number 1 in FIG. 1 indicates a motor vehicle tire comprising, along the outer edge, a tread 2, and, close to the inner edge, two beads 3, each having a bead filler 4. Each bead 3 is connected to a lateral end of tread 2 by a respective sidewall portion 5 comprising an inner reinforcing cord assembly 6 defined by at least two layers 7 of reinforcing cords 8. Cords 8, wound about respective bead 3, are each connected to a corresponding cord 8 in the other layer 7, and extend substantially radially outwardly of bead 3 to define an annular chamber 9 housing respective bead 3 and filler 4.

According to the preferred embodiment shown in FIG. 1, cords 8 are the reinforcing cords of a tubular body ply 10 wound about beads 3 and fillers 4, and folded outwardly to define an inner layer 11 and an outer layer 12 substantially contacting each other, and which define the two chamber 9 and are reinforced internally by layers 7.

Figure 2:
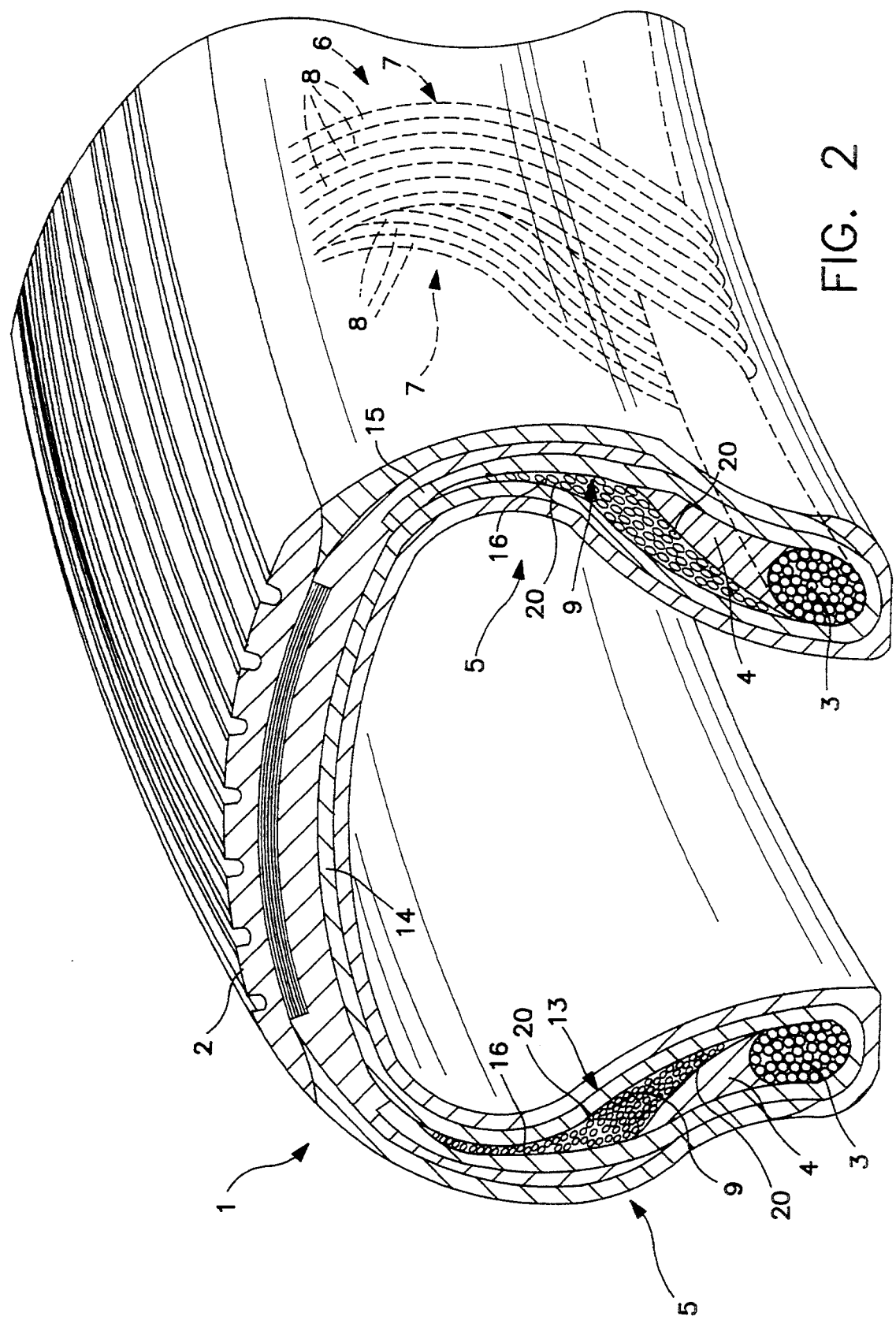
FIG. 2 shows the same view of a variation of the FIG. 1 tire.

In the FIG. 2 variation, cords 8 are the reinforcing cords of a usual body ply 13, comprising a first portion 14 extending between beads 3; and two second portions 15 extending in opposite directions outwardly of respective beads 3, and turned up about beads 3 and fillers 4 to define respective annular chambers 9.

In each sidewall portion 5, reinforcing cords 8 in one of layers 7 constitute the inner reinforcing cord assembly of said first portion 14, while cords 8 in the other layer 7 constitute the inner reinforcing cords assembly of said second portion 15.

Each chamber 9 houses an annular spacer layer or element 16 made of relatively lightweight, preferably elastomeric sponge material, and located between layers 7 so as to fill the part of chamber 9 unoccupied by bead 3 and filler 4, and maintain, at each point of layers 7, a given clearance proportional to the rigidity required, at that point, of respective sidewall portion 5.

As shown in FIGS. 1 and 2, each spacer element 16 has a lenticular or bi-convex shaped cross-sectional configuration wherein each of the opposite surfaces have a convex portion 20 when the tire is in its normal running condition. The spacers 16 are formed of various lightweight materials, such as a synthetic rubber containing a lightweight blowing or filling agent providing a sponge material, or may be a type of polyurethane foam, or thermosetting plastic containing a filler to provide a flexible sponging characteristic thereto.

In view of the relatively lightweight material of spacer elements 16, thee have substantially no effect on the weight of tire 1, while enabling the clearance at each point of layers 7 of each sidewall portion 5 to be varied as required within a given range, thus varying the moment of inertia and, consequently also, the flexural rigidity of sidewall portions 5 without any appreciable increase in weight of the tire. Although spacers 16 provide increased rigidity in the sidewall portions of the tire, it is not intended to, nor does it prevent, total collapse of the tire upon loss of pressure, since it is not intended to be a "run-flat" tire.

Likewise the particular composition of spacers 16 may vary without effecting the results achieved. As indicated, spacers 16 are formed of a lightweight sponge material having sufficient stiffness to maintain the cords in the outer and inner layers separate, but without materially increasing the weight of the tire as do run-flat tires having rigid rubber inserts.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A tire for motor vehicles, including an outer tread; two beads; two bead fillers; and two annular sidewall portions, each connecting a respective said bead to the tread; each sidewall portion including an inner reinforcing cord assembly defined by at least two spaced apart first layers of reinforcing cords on opposite sides of and extending substantially radially outwardly of said bead, to define a chamber housing said bead and said bead filler; the improvement comprising the addition of a lightweight stiffening spacer housed inside each of said chambers and extending between said respective two first layers, said spacer being formed of a lightweight sponge material and having a generally lenticular or biconvex-shaped cross-sectional configuration with a convex surface portion on both sides of the spacer for maintaining clearance between said first layers of reinforcing cords to provide lateral stability to the sidewalls of the tire by increasing the moment of inertia of said vehicle tire when the vehicle tire is inflated, yet which permits total collapse of said side wall portions when the tire is deflated.

2. A tire as claimed in claim 1, wherein in each of said sidewall portions, the cords in each of said first layers are wound about said bead and are each connected to a corresponding cord in the other of said first layers; said cords defining said chamber.

3. A tire as claimed in claim 2, wherein said cords are the reinforcing cords of a body ply comprising a first portion extending between said two beads, and two second portions extending in opposite directions outwardly of said two beads; the reinforcing cords of said first portion being, in each sidewall portion, the cords in one of said first layers; each second portion being turned up into contact with the first portion; and the reinforcing cords of each of said second portions being, in the respective sidewall portion, the cords in the other of said first layers.

4. A tire as claimed in claim 2, wherein said cords are the reinforcing cords of a tubular body ply wound about said beads and said bead filler, and folded outwardly as of said beads, to define an inner layer and an outer layer substantially contacting each other; the reinforcing cords of said inner layer and said outer layer constituting, in each of said sidewall portions, the cords of said two first layers.

5. A tire as claimed in claim 1, wherein said spacer is an elastomeric sponge material.

* * * * *